May 6, 1969

R. B. HAZEN 3,443,149

SPARK GAPS

Filed March 20, 1967

INVENTOR.
RAMON B. HAZEN
BY
ATTORNEY

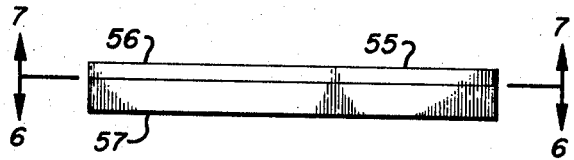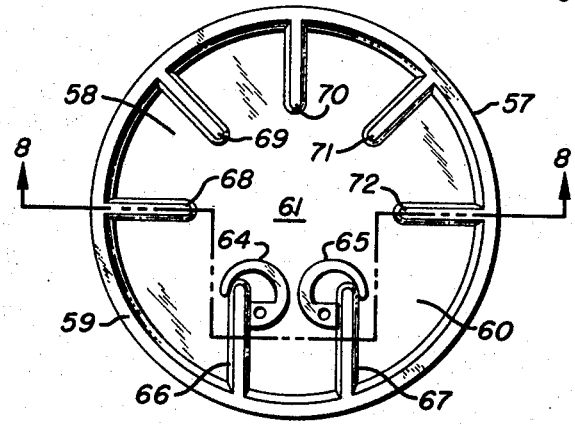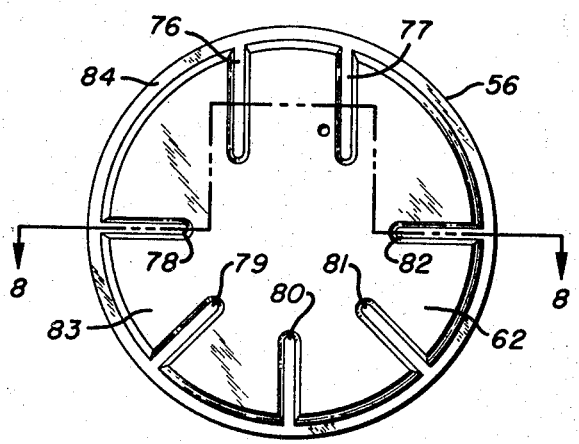

May 6, 1969

R. B. HAZEN 3,443,149

SPARK GAPS

Filed March 20, 1967

INVENTOR.
RAMON B. HAZEN
BY
ATTORNEY

United States Patent Office 3,443,149
Patented May 6, 1969

---

1

3,443,149
SPARK GAPS
Ramon B. Hazen, Medina, Ohio, assignor to The Ohio Brass Company, Mansfield, Ohio, a corporation of New Jersey
Filed Mar. 20, 1967, Ser. No. 624,375
Int. Cl. H01j 7/44, 13/46
U.S. Cl. 315—36   11 Claims This invention relates to spark gaps for lightning arresters, overvoltage discharge devices, arc switches, and the like.

A principal object of the invention is to increase the arc voltage and interrupting capability of spark gaps for lightning arresters and the like.

In practicing the invention of United States Patent 2,825,008, issued Feb. 25, 1958, and United States Patent 3,019,367, issued Jan. 30, 1962, it has been discovered that certain improvements in result may be accomplished by forming the gap plates of various porous materials. For example, particulate alumina structures manufactured by producers in which grains of alumina are pressed together in a coherent mass to form the gap plate, and are thereafter fired to form the plate, provide a rigid ceramic piece suitable for employment in the stacked structures described particularly in U.S. Patent 3,019,367. The present invention relates to new arrangements of the gap plates and gap chambers useful in practicing the inventions of those patents.

According to the invention, the arc suppressing chamber of the prior art spark gaps, referred to above, is extended by a supplementary chamber which extends outwardly from the arc suppressing chamber at the radial extremity thereof. That portion of the arc chamber referred to as the arc suppressing chamber in the prior art device functions in the improved device described herein as an arc elongation chamber, while the auxiliary chamber functions as an arc extinguishing chamber and is referred to herein as an outer chamber. According to one embodiment of the invention, the outer chamber is conveniently formed by convergent wall portions defined by complementary ridge and recess means extending circumferentially about two complementary gap plates. It is an important aspect of the invention that the outer chamber may be combined with radially extending barrier members for augmenting the arc lengthening function in the arc elongation chamber.

The invention, together with further objects, features, and advantages thereof, will be understood from the following detailed specification and claims taken in connection with the appended drawings, in which:

FIG. 5 is a side elevation view of a second spark gap embodying the principles of the invention;

FIG. 6 is a plan view of one gap plate of the spark gap of FIG. 5, taken in the direction 6—6 in FIG. 5;

2

FIG. 7 is a plan view of the second gap plate of the spark gap of FIG. 5, taken in the direction 7—7 in FIG. 5; and FIGS. 8 to 11 illustrate several embodiments of the spark gap of FIG. 5.

Figure 1:
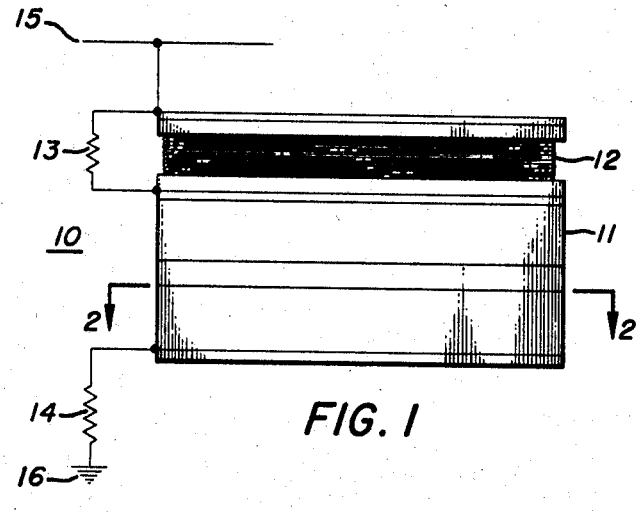
FIG. 1 is a schematic showing of a lightning arrester with a side elevation view of a spark gap embodying the present invention.

Referring now to FIG. 1, the lightning arrester 10 embodying the invention comprises a spark gap 11, a magnetic coil 12 for moving the arcs of the spark gap 11, a non-linear resistor 13 connected in parallel with the magnetic coil 12 for controlling the voltage across the coil, and a non-linear valve resistor or valve block 14 connected in series with the spark gap 11 and the magnetic coil 12 and resistor 13. The arrester elements 11 to 14 inclusive are connected between a conductor 15 and a ground 16 for discharging overvoltages, particularly those resulting from atmospheric activity, lightning and the like, as described in the two patents above referred to.

Figure 3:
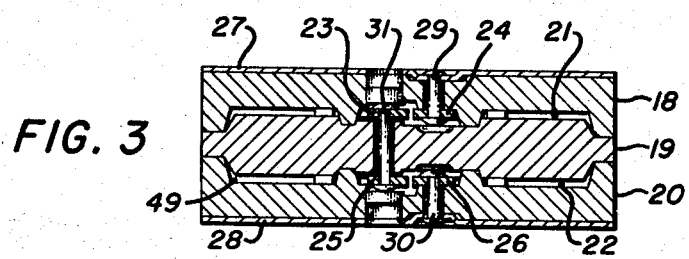
FIG. 3 is a sectional view through the spark gap of FIG. 1, taken in the direction referred to by the line 3—3 in FIG. 2.

As shown in FIG. 3, the spark gap 11 comprises three formed ceramic gap plates 18, 19, and 20, the center gap plate 19 being formed on the two sides thereof to complement the two end gap plates 18 and 20 and define arc chambers 21 and 22 between the adjacent faces of the respective plates. The end gap plate 18 carries two electrodes 23 and 24, and the end gap plate 20 carries two gap electrodes 25 and 26. Each of the gap electrodes is suitably secured to the associated gap plate, and the gap electrodes 24 and 26 are connected to two terminal plates 27 and 28 which extend over the outer surfaces of the two gap plates 18 and 20 by metallic connectors, such as rivets 29 and 30. The two gap electrodes 23 and 25 are connected by a metallic connector such as the rivet 31. With this arrangement, the two spark gaps are connected in series and to the two terminal plates 27 and 28 to constitute the complete spark gap assembly.

Figure 2:
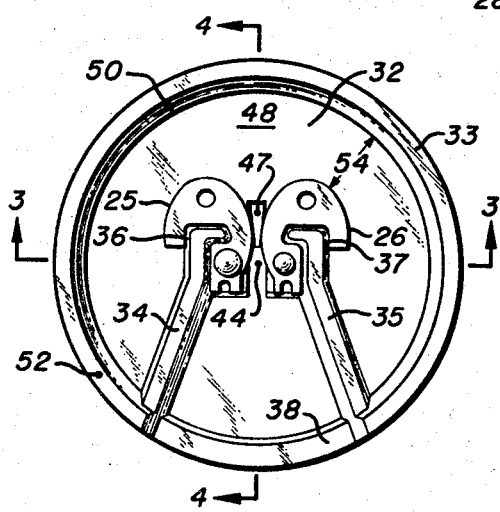
FIG. 2 is a plan view of an end gap plate of the spark gap of FIG. 1.
Figure 4:
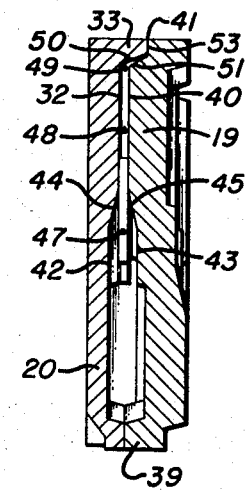
FIG. 4 is a sectional view of the center gap plate of the spark gap, taken in the direction referred to by the line 4—4 in FIG. 2 and FIG. 3.

As illustrated in FIG. 2 and FIG. 4 for the gap chamber 22, the gap plate 20 comprises a circular ceramic plate having an interior surface 32 defining the gap chamber 22, and a circumferential ridge 33 extending about and enclosing the exterior periphery of the chamber. The two gap electrodes 25 and 26 are secured to the gap plate 20 centrally of the plate by rivets, as heretofore described, and epoxy adhesives. Two elevated portions or ridges 34 and 35 extend above the surface 32 of the plate intermediate between the level of that surface and the level of the ridge 31. The ridges 34 and 35 define the circumferential extremities of the arc chamber 22 and the limit of elongating arc movement from the adjoining arcing faces of the electrodes 23 and 24, and extend from the ridge 33 into the recesses 36 and 37 on the interior of the electrodes 23 and 24. The ridge 33 extends circumferentially of the gap plate only to the ridges 34 and 35, and a recess 38 is formed along the periphery of the plate 20 between the ridges 34 and 35 for receiving a ridge 39 on the gap plate 16.

As shown in FIG. 4, the gap plate 19 is formed on the side thereof adjacent the gap plate 20 with a flat surface 40 which cooperates with the surface 32 of the plate 20 to form the gap chamber 22. A circumferential recess 41 is complementary to the peripheral ridge 33 and receives the ridge along the circumferential extent thereof. The circumferential recess 38 of the plate 20 is complementary to the ridge 39 of the plate 19 and receives the ridge 39 along the circumferential extent thereof.

The portions of the adjoining surfaces of the plates 19 and 20 which define the arc gap chamber 22 appear in FIG. 4 and include surfaces 42 and 43 spaced from the surfaces 32 and 40, respectively, to constitute an arc recess 44 about the adjacent portions of the electrodes 25 and 26; two surfaces 45 and 46 convergent toward each other from the surfaces 42 and 43 to the surfaces 32 and 40, respectively, to constitute an arc entrance chamber 47; and the two spaced parallel surfaces 32 and 40 which constitute an arc elongation chamber extending radially from the electrodes to adjacent the rim 33. The arc recess 44 has a relatively great axial extent to facilitate formation of the arc between the electrodes 25 and 26, and the entrance chamber 47 facilitates movement of the arc from the arc recess between the relatively narrow spaced surfaces 32 and 40 of the elongation chamber during outward movement of the arc, all in accordance with the teachings of the above-referenced patents.

According to the present invention, an arc outer chamber 49 is provided at the radial extremity of the arc elongation chamber 48 for further elongation and extinguishing, or for extinguishing an arc which has moved to the radial extremity of the elongation chamber 48 under the influence of the magnetic field generated by the coil 12. The outer chamber 49 is defined by the convergent surfaces 50 and 51 of the two gap plates 19 and 20 extending circumferentially about the gap plates 19 and 20, coextensive with the ridge 52 and recess 41 to the ridge 34 and the ridge 35. The surface 50 comprises the inside face of the peripheral ridge 33 of the end gap plate 20 and extends from the interior surface 32 of the plate 20 to the radially extending exterior surface 52 of the ridge 33. The surface 51 comprises the outside face of the body of the center gap plate 19 and extends from the interior surface 40 of the plate 19 to the radially extending surface 53 of the recess 41.

In one lightning arrester constructed in accordance with the above, the surfaces 50 and 51 were tapered at angles of about 10 degrees of separation, the surface 50 being inclined at an angle of 20 degrees with respect to the longitudinal axis of the gap, and the surface 51 being inclined at an angle of 30 degrees with respect to the longitudinal axis of the gap. The surfaces 32 and 40 of the arc elongation chamber 48 were spaced apart about .060 inches and the outer chamber 49 had a depth of about .147 inches measured along the surface 51, from the surface 40 to the surface 53, or .127 inches in the longitudinal direction of the gap assembly.

In operation, an arc between the gap electrodes 25 and 26 is formed between the adjacent faces of the two electrodes, in the arc recess 44, and is moved radially outward along the electrodes 25 and 26, through the entrance chamber 47, and into the arc elongation chamber 48 under the influence of the magnetic field of the coil 12. The arc is lengthened by simultaneous radial and circumferential movements of the plasma body so that it ultimately extends continuously from the gap electrode 25, along the interior of the ridge 34, along the interior of the ridge 33, and along the interior of the ridge 35 to the electrode 36, that is, substantially along the radially interior or entrance portion of the outer chamber 49. Further movement of the arc into the outer chamber 49 then requires a continuing magnetic field resulting from discharge currents of appropriate duration and/or magnitude.

The movement of the arc into the outer chamber 49 is a result of the inclination of the outer chamber 49 with respect to the direction of the field. Thus, the radial force generated by the interaction of the arc with the magnetic field tends to drive the arc against the outside surface 50 of the plate 20, producing a longitudinal component of force which moves the arc in the longitudinal direction of the spark gap and between the converging surfaces 50 and 51. The longitudinal movement of the arc against the surfaces 50 and 51 increases the resistance of the arc and the voltage generated by the arc so that the arc is ultimately extinguished by reason of the arc voltage reaching system or impressed voltage.

The inclination of the surfaces 50 and 51 and the depth of the chamber 49 is such that the arc, when in the chamber 49, is substantially out of the plane of the opening between the plates 20 and 19 which constitute the chamber 48. Accordingly, that portion of the body of the plate 19 which is radially coextensive with the adjacent portions of the chamber 49 serves as a barrier separating the circumferential and radially extending portions of the arc. Because of the barrier function accomplished by the body of the plate 19, the radial distance between the electrodes 25 and 26 and the outward extremity of the chamber 48 can be substantially less than the corresponding distance in gaps constructed in accordance with prior art designs. Thus, the radial distance indicated at 54 in FIG. 2 may be in the order of .50 inch in the gap described herein, without arc instability. Arc instability would result from formation of a shunt arc between the circumferentially extending portion of the arc and the adjacent portion of the electrode radially inward therefrom because of the variation in arc voltage independent of arc current, and the arrangement disclosed herein permits increased arc currents, that is, arc currents in the order of 1000 to 2000 amperes for the dimensions above referred to.

The above assumes that the arc is lengthened to the full extension thereof along the ridges 34, 33, and 35 for generating maximum arc voltage when so required by the nature of the duty or of the discharge. However, the arc may move into the outer chamber 49 along limited portions thereof, for example, symmetrically between the electrodes 25 and 26; and lengthening of the arc may be accomplished by simultaneous circumferential movement of the lateral extremities of the arc toward the ridges 34 and 35. Also, the arc may be extinguished or lengthened during any portion of the movement through the chamber 48 or into or in the chamber 49. The characterization of the arc chambers is not to be taken as a limitation upon the functioning thereof.

The gap 55 of FIGS. 5, 6, and 7 is generally similar to the gap 11 of FIG. 4 in the provision of gap electrodes, an arc gap chamber comprising an arc recess, arc entrance chamber, arc elongation chamber, and gap plates of porous ceramic material. The gap 55 is distinguished from the gap 11 in the provision of radially extending arc barriers for increased arc elongation and in the several embodiments of the outer chamber illustrated in FIGS. 8, 9, 10, and 11.

The spark gap 55 comprises two plates 56 and 57 of porous ceramic material suitably configured on adjacent surfaces thereof to constitute the arc gap chambers, electrode recesses, and the like, as described for the spark gap 11 and plates 19 and 20 thereof. As appears from FIG. 6 and FIG. 7, the plate 57 comprises a circular disc-like body 58 having a peripherally extending rim or ridge 59 and an interior surface 60. The surface 60 defines one face of an arc elongation chamber 61, with the second or opposite face defined by the surface 62 of the associated top plate 56. The bottom plate 57 carries two gap electrodes 64 and 65 which are secured to the body 58 by rivets, epoxy adhesives, or the like.

The bottom plate 57 is formed with ridges 66 and 67 extending parallel to a diametral axis between the electrodes 64 and 65 to the circumferential ridge 59, and ridges 68, 69, 70, 71, and 72 extending radially from the center of the plate along the outward part thereof to the circumferential ridge 59. The ridges 66 to 72 are formed as integral parts of the body 58 adn extend longitudinally through the arc chamber and contact the upper plate 56 along recessed surfaces 76 to 82 formed in the body 83 of the top plate 56. The recesses 76 to 82 extend radially inward from and terminate radially outward at a recess and surface 84 which extends circumferentially about the body 83 of the plate 56 to receive the ridge 59 of the plate 57.

The ridges 66 and 67 function as barrier members to limit the circumferential elongation of an arc formed between the electrodes 64 and 65, that is, to define the circumferential limits of the entire arc chamber 61. The ridges 68 to 72 function primarily as barrier members to increase the arc elongation distance or arc path by reason of the folding of the arc about the inner extremity of the barrier during the radially outward movement of the arc under the influence of the magnetic field. Thus, increased arc length is provided by movement of the arc about the inward extremities of the ridges, outward between the ridges and along the interior surfaces of the ridges, which define the arc chamber 61.

Figure 8:
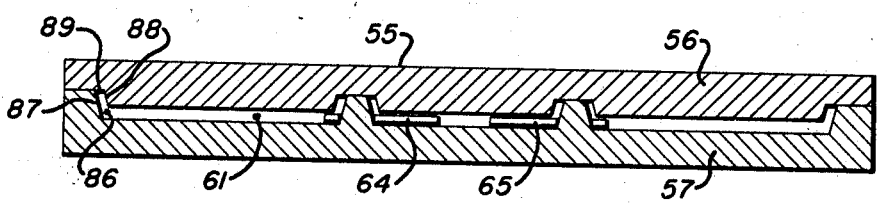

According to the embodiment illustrated in FIG. 8, the gap 55 is constructed with an outer chamber 86 extending along the circumferential and radial extremities of the arc elongation chamber 61, and disposed in inclined relation thereto, similar to the arrangement of the outer chamber 49 of the sprak gap 11. However, as appears from FIG. 8, the outer chamber 86 is defined by parallel surfaces 87 and 88 formed on the adjacent portions of the gap plates 57 and 56, respectively. The outer chamber 86 and the defining surfaces 87 and 88 extend along the interior of the circumferential ridge 59, and along both sides and about the inner extremity of each of the ridges 66 to 72 of the plate 57, and along the exterior surface of the body of the plate 56 which defines the recess 84, and along both sides and about the interior extremity of the interior surfaces of the plate 56 which define the recesses 76 to 82. The top surface 89 of the outer chamber 86 is defined by that portion of the face of the plate 56 which comprises the surface 84 and the bottom surfaces of the recesses 76 to 82. Thus, the transverse extent of the recesses 76 to 82 is greater than the transverse extent of the ridges 66 to 72 by about twice the cross sectional width of the outer chamber 86.

The spark gap 55 functions in substantially the same way as the spark gap 11, insofar as elongating movement of the arc and isolation of the coextensive or closely adjacent portions of the arc is concerned. The isolating function of the outer chamber is of particular importance with respect to the spacing 90 between the inner extremities of the radial barriers 68 to 72, so that substantial increase in arc length is provided by folding the arc about and between the ridges during elongating movement thereof. Without the arc isolation accomplished by the outer chamber, the length of the ridges 68 to 72 is limited by the tendency to form a shunt arc between the adjacent portions of the folded arc.

Figure 9:
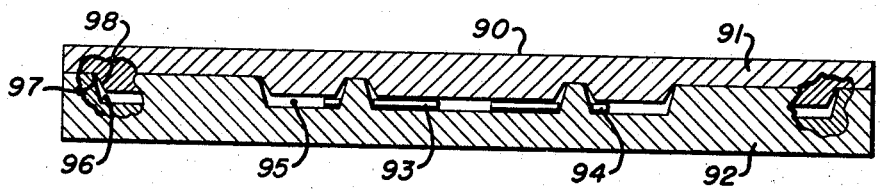
Figure 10:
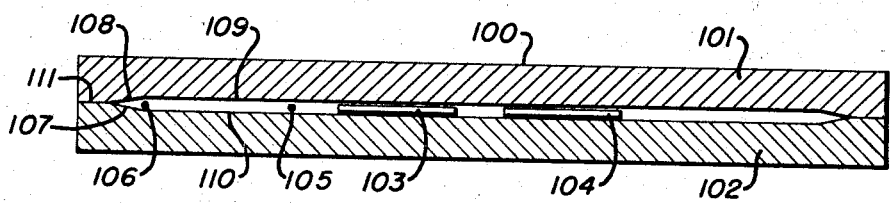

According to the embodiment illustrated in FIG. 9, the spark gap 90 comprises two gap plates 91 and 92, similar to the gap plates 56 and 57 of the spark gap 55, two electrodes 93 and 94, an arc elongation chamber 95, and an arc outer chamber 96. The outer chamber 96 comprises a wedge-shaped space defined by two convergent surfaces 97 and 98 formed on the adjacent portions of the gap plates 91 and 92 and extending along the circumferential and radial ridges of the gap plate 92 and along the circumferential and radial recesses of the gap plate 91, in an arrangement similar to that of the convergent surfaces 50 and 51 in the gap plates 20 and 19.

In the construction of the spark gap 11 and the embodiments of the spark gap 55, illustrated in FIG. 8 and FIG. 9, it is important that the gap plates be made of permeable ceramic material, to facilitate movement of the arc into the outer chamber, to produce an increase in plasma resistance, and to facilitate arc extinction in the outer chamber. Thus, as with the gap plates of the prior art, which have been constructed of porous material, it is necessary that the porous material exhibit the necessary permeability characteristics in localized regions along the gap chamber so that the pressure differential between the region immediately ahead of the arc and the region immediately behind the arc be minimized during movement and elongation of the arc. Additionally, in the spark gap of the present invention, improved results are achieved by constructing the gap plate with porous ceramic material permeable through the plate from the interior to the exterior of the gap plates adjacent the outer chamber.

Gap plates suitable for the practice of the invention have been manufactured with a body of porous alumina, and the permeability characteristic is demonstrated, for example, by the fact that compressed air may be passed through the body of the plate or from the interior of the outer chamber to the exterior. A wide variety of ceramic materials, known in the art, are useful for constructing the porous body. However, the operational and duty considerations affecting the design of the spark gap will determine the exact permeability, strength, and rigidity characteristics of the plates as well as the physical characteristics of the materials themselves.

The advantageous functioning of a gap chamber having convergent surfaces in gap plates having permeable walls may be utilized in spark gaps which do not perform the arc isolating function of the spark gaps of FIGS. 4, 8, and 9. Thus, the spark gap 100 of FIG. 10 comprises two gap plates 101 and 102, similar to the gap plates 56 and 57 of the spark gap 55, two electrodes 103 and 104, an arc elongation chamber 105, and an arc outer chamber 106. The outer chamber 106 comprises a wedge-shaped space defined by two convergent surfaces 107 and 108 formed on the radially outward extremities of the plates 101 and 102, and symmetrically disposed with respect to the surfaces 109 and 110 which define the arc elongation chamber 105, and with respect to the center plane 111 of the gap plates 101 and 102. As illustrated, the surfaces 107 and 108 have a planar disposition inclined with respect to the surfaces 109 and 110 at angles of approximately 10 degrees. The surfaces 107 and 108 may converge uniformly or non-uniformly in the radial direction and the convergence may be either convex or concave according to the nature of the duty imposed. The outer chamber 106 may have a radial extent of from 10% of the radial extent of the arc elongation chamber from the electrodes to the entire radial extent. This relation is susceptible of wide variation, being determined by materials and design duty, as set forth above, and particularly the permeability characteristics of the plates. In general, the rate of convergence of the outer chamber may be increased with increase in permeability of the plates.

Figure 11:
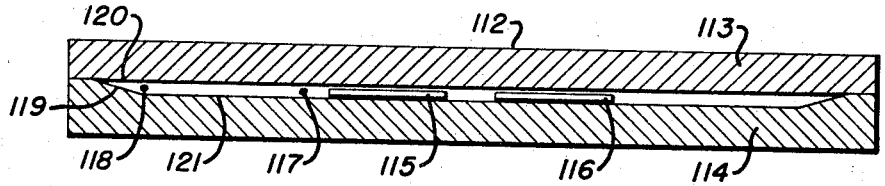

The spark gap 112 of FIG. 11 comprises two gap plates 113 and 114, similar to the gap plates 56 and 57 of the spark gap 55, two electrodes 115 and 116, an arc elongation chamber 117, and an arc outer chamber 118. The outer chamber 118 comprises a wedge-shaped space defined by a surface 119 inclined with respect to the center plane surface 120 of the gap plate 113 which defines, with the surface 121 of the gap plate 114, the arc elongation chamber 117. The convergence of the surface 119 with respect to the plane surface 120 follows the same general considerations set forth above with respect to the surfaces 107 and 108 of the outer chamber 106.

Inasmuch as the isolating function of the outer chambers 49, 86, and 91 is not accomplished by the outer chambers 106 and 118, it will be seen that radial arc barriers of lesser radial extent are preferred in embodiments of the spark gaps 100 and 112.

All of the outer chambers 49, 86, 91, 106, and 118 promote arc voltage generation when the arc enters the outer chamber, and spark gaps constructed in accordance herewith exhibit increased arc voltage per unit length of arc and increased arc length per gap or per unit height of gap assembly with respect to the gaps of the prior art.

The apparatus described herein may be utilized with or embody the features of the spark gaps described in United States application Ser. No. 585,846, filed Oct. 11, 1966, by T. R. Connell, and the features of the spark gaps described in United States application Ser. No. 598,467, filed Dec. 1, 1966, by T. R. Connell and R. E. Putt.

It is to be understood that the foregoing description is not intended to restrict the scope of the invention and that various rearrangements of the parts and modifications of the design may be resorted to. The following

I claim:

1. A spark gap comprising two gap plates of rigid ceramic material, a pair of two gap electrodes arranged between the plates, the adjacent faces of the plates being spaced apart to constitute an arc gap chamber for receiving an arc formed between the two gap electrodes, and the two electrodes diverging apart from the closest point thereof for continuous elongating movement of an arc in the arc chamber and movement along the arc electrodes, and means closing the peripheral extremity of the gap chamber comprising interengaging ridge and recess means extending along the peripheral extremities of the gap plates and defining the radial limit of the gap chamber, the arc gap chamber including as parts thereof an arc elongation chamber comprising parallel surfaces of the gap plates coextensive with the arc gap electrodes, extending to adjacent the ridge and recess means and an arc outer chamber comprising converging surface portions of the gap plates communicating with the arc elongation chamber adjacent the radial extremity of the gap plates, the gap plates comprising porous ceramic material which is permeable transversely through the walls thereof from the interior of the outer chamber to the exterior of the gap plates.

2. A spark gap in accordance with claim 1, in which the arc outer chamber is directed angularly away from the arc elongation chamber in the longitudinal direction of the gap plates.

3. A spark gap in accordance with claim 2, in which the arc outer chamber is defined by converging surface portions of the gap plates defining the ridge means on one gap plate and the recess means on the other gap plate.

4. A spark gap comprising two gap plates of rigid ceramic material, a pair of two gap electrodes arranged between the plates, the adjacent faces of the plates being spaced apart to constitute an arc gap chamber for receiving an arm formed between the two gap electrodes, and the two electrodes diverging apart from the closest point thereof for continuous elongating movement of an arc in the arc chamber and movement along the arc electrodes, and means closing the peripheral extremity of the gap chamber comprising interengaging ridge and recess means extending along the peripheral extremities of the gap plates and defining the radial limit of the gap chamber, the arc gap chamber including as parts thereof an arc elongation chamber comprising spaced surfaces of the gap plates coextensive with the arc gap electrodes extending radially from the electrodes, and an arc outer chamber comprising spaced surface portions of the two gap plates inclined with respect to the said surfaces of the gap plates in the longitudinal direction of the gap plates, disposed adjacent the radial extremities of the gap plates, and extending circumferentially along the plate.

5. A spark gap in accordance with claim 4, in which the gap plates are constructed or porous ceramic material which is permeable transversely through the walls thereof from the interior of the outer chamber to the exterior of the gap plates.

6. A spark gap in accordance with claim 5, in which the arc outer chamber is defined by surface portions of the gap plates defining the ridge means on one gap plate and the recess means on the other gap plate.

7. A spark gap in accordance with claim 6, with converging surface portions of at least one of the gap plates directed angularly away from the arc elongation chamber in the longitudinal direction of the gap plates.

8. A spark gap in accordance with claim 2 or claim 7, in which the depth of the outer chamber is at least equal to the spacing of the surfaces of the gap plates comprising the arc elongation chamber.

9. A spark gap in accordance with claim 2 or claim 7, in which the convergence of the outer chamber is determined by the permeability of the gap plates.

10. A spark gap in accordance with claim 5, with barrier means comprising a radially extending member of ceramic material disposed between the plates in contact therewith for determining arc movement along an exterior surface thereof.

11. A spark gap in accordance with claim 10, in which the barrier member is integral with one of the gap plates and contacts the remaining plate along adjacent surface portions thereof, and the arc outer chamber is defined by spaced surface portions of the gap plates defining the ridge means on one gap plate and recess means on the other gap plate.

References Cited

UNITED STATES PATENTS

| | | | |
|---|---|---|---|
| 2,623,197 | 12/1952 | Kalb | 315—36 |
| 2,825,008 | 2/1958 | Kalb | 315—36 |
| 3,076,114 | 1/1963 | Hicks | 315—36 X |

JOHN W. HUCKERT, *Primary Examiner.*

J. R. SHEWMAKER, *Assistant Examiner.*

U.S. Cl. X.R.

313—326